United States Patent
Fukuda et al.

(10) Patent No.: US 10,723,336 B2
(45) Date of Patent: Jul. 28, 2020

(54) AUTOMATIC DECELERATION CONTROL DEVICE

(71) Applicant: TOYOTA JIDOSHA KABUSHIKI KAISHA, Toyota-shi, Aichi-ken (JP)

(72) Inventors: Hiroki Fukuda, Toyota (JP); Yoshinori Watanabe, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 488 days.

(21) Appl. No.: 15/264,973

(22) Filed: Sep. 14, 2016

(65) Prior Publication Data

US 2017/0072926 A1 Mar. 16, 2017

(30) Foreign Application Priority Data

Sep. 16, 2015 (JP) ................. 2015-183007

(51) Int. Cl.
| | |
|---|---|
| B60T 8/74 | (2006.01) |
| B60W 10/184 | (2012.01) |
| B60W 10/04 | (2006.01) |
| B60W 30/14 | (2006.01) |
| B60T 8/1755 | (2006.01) |

(52) U.S. Cl.
CPC ............. B60T 8/74 (2013.01); B60T 8/1755 (2013.01); B60W 10/04 (2013.01); B60W 10/184 (2013.01); B60W 30/146 (2013.01); *B60T 2201/16* (2013.01); *B60T 2210/36* (2013.01); *B60T 2270/611* (2013.01); *B60W 2552/05* (2020.02)

(58) Field of Classification Search
CPC ... B60T 8/74; B60T 2270/611; B60W 10/184; B60W 30/146; B60W 2550/141
USPC .......................................................... 701/93
See application file for complete search history.

(56) References Cited

U.S. PATENT DOCUMENTS

| | | | | |
|---|---|---|---|---|
| 5,611,753 A | * | 3/1997 | Kondo | ................ F16H 61/0213 477/118 |
| 8,457,827 B1 | | 6/2013 | Ferguson et al. | |
| 2005/0124458 A1 | * | 6/2005 | Iwatsuki | .............. B60W 10/115 477/34 |
| 2005/0125134 A1 | * | 6/2005 | Iwatsuki | ............... B60T 8/1755 701/70 |
| 2005/0125137 A1 | * | 6/2005 | Shiiba | ................ B60K 31/0008 701/96 |

(Continued)

FOREIGN PATENT DOCUMENTS

| | | |
|---|---|---|
| CN | 1624360 A | 6/2005 |
| JP | 2006-193095 A | 7/2006 |

(Continued)

*Primary Examiner* — Khoi H Tran
*Assistant Examiner* — Rodney P King
(74) *Attorney, Agent, or Firm* — Sughrue Mion, PLLC

(57) ABSTRACT

An automatic deceleration control device includes an electronic control unit including a central processing unit, the electronic control unit configured to: acquire road-type information that is information about a type of a road on which a vehicle is traveling; set a maximum deceleration based on the road-type information; and output a signal to decelerate the vehicle at a first deceleration that is equal to or lower than the maximum deceleration, when an actual vehicle speed of the vehicle exceeds a target vehicle speed of the vehicle.

9 Claims, 3 Drawing Sheets

(56) References Cited

U.S. PATENT DOCUMENTS

| | | | | |
|---|---|---|---|---|
| 2011/0066342 A1* | 3/2011 | Ozaki | .................... | B60T 7/042 |
| | | | | 701/70 |
| 2012/0325573 A1* | 12/2012 | Miller | ...................... | B60L 7/24 |
| | | | | 180/282 |
| 2013/0090822 A1* | 4/2013 | Schwindt | .......... | B60K 31/0008 |
| | | | | 701/70 |
| 2013/0226429 A1* | 8/2013 | Udaka | ................ | B60T 8/17616 |
| | | | | 701/73 |
| 2013/0289874 A1* | 10/2013 | Taguchi | ............. | B60W 30/146 |
| | | | | 701/533 |
| 2016/0101780 A1* | 4/2016 | Park | ................. | B60W 50/0097 |
| | | | | 701/70 |

FOREIGN PATENT DOCUMENTS

| | | |
|---|---|---|
| JP | 2007-216839 A | 8/2007 |
| JP | 2015-516623 A | 6/2015 |
| WO | 2013/138000 A1 | 9/2013 |

* cited by examiner

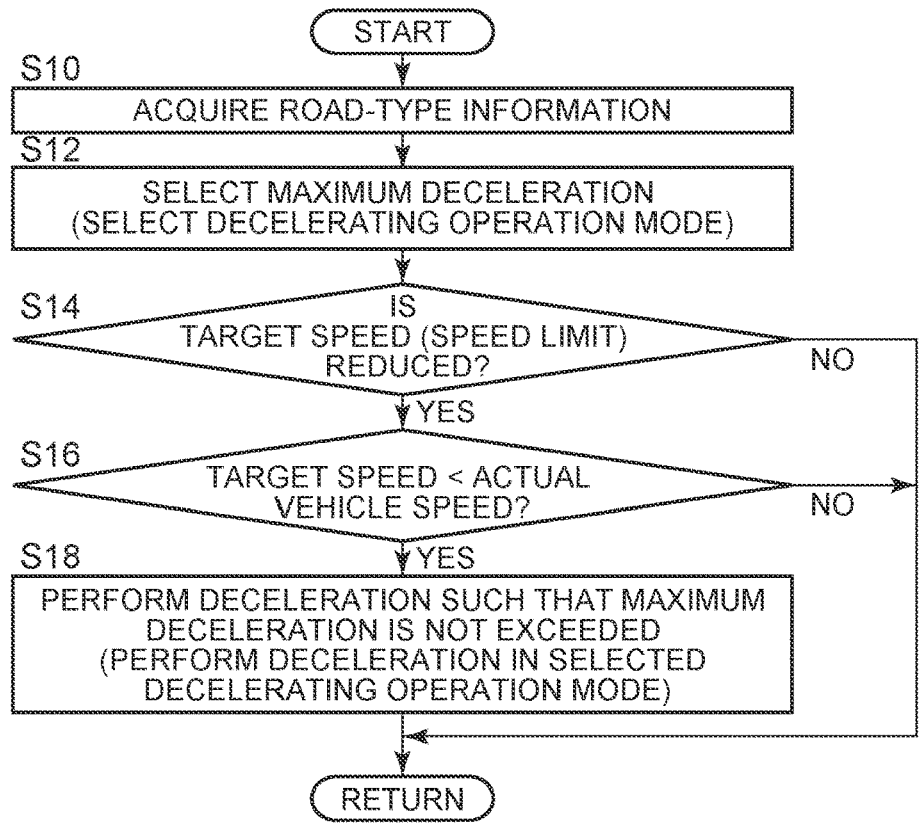
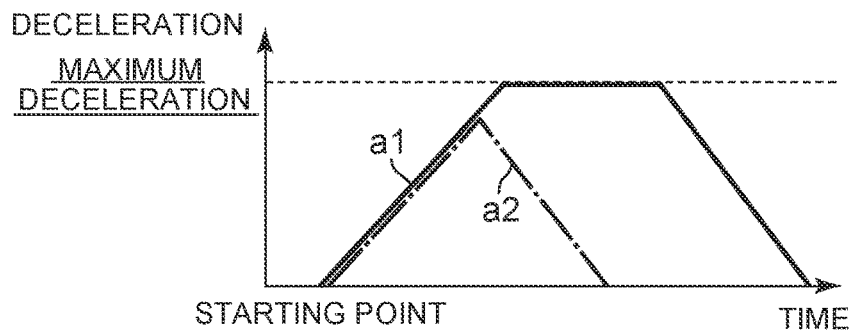
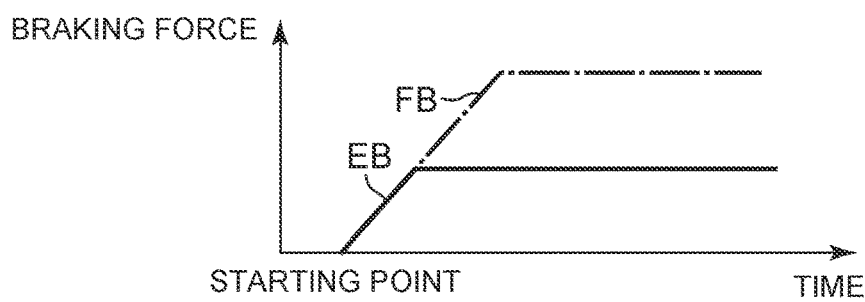

FIG. 3A

HIGHWAY

| LARGE CLASSIFI-CATION | SMALL CLASSIFICATION | DECEL-ERATION |
|---|---|---|
| JCT | | G3 |
| MERGING POINT | | G1 |
| EXIT POINT | | G3 |
| TUNNEL | | G1 |
| BRIDGE | | G1 |
| CLIMBING LANE | | G1 |
| THE NUMBER OF LANES ON ONE SIDE | 1 | G1 |
| | 2 OR MORE | G1 |
| GRADIENT | UP GRADE OF 3% OR MORE | G1 |
| | DOWN GRADE OF 3% OR MORE | G1 |
| ROAD WIDTH | 3.25 m OR MORE | G1 |
| | LESS THAN 3.25 m | G1 |
| CURVE RADIUS | 300 m OR MORE | G1 |
| | LESS THAN 300 m | G1 |

ORDINARY ROAD

| LARGE CLASSIFI-CATION | SMALL CLASSIFICATION | DECEL-ERATION |
|---|---|---|
| SCHOOL ZONE | | G3 |
| TUNNEL | | G1 |
| BRIDGE | | G1 |
| THE NUMBER OF LANES ON ONE SIDE | 1 | G2 |
| | 2 OR MORE | G1 |
| GRADIENT | UP GRADE OF 10% OR MORE | G1 |
| | DOWN GRADE OF 10% OR MORE | G1 |
| ROAD WIDTH | 3.00 m OR MORE | G1 |
| | LESS THAN 3.00 m | G1 |
| CURVE RADIUS | 60 m OR MORE | G2 |
| | LESS THAN 60 m | G1 |
| SIGN OF "BICYCLE AND PEDESTRIAN LANE" | PRESENT | G1 |
| | ABSENT | G2 |

FIG. 3B

HIGHWAY

| LARGE CLASSIFI-CATION | SMALL CLASSIFICATION | WHETHER HYDRAU-LIC BRAKE IS USED |
|---|---|---|
| JCT | | YES |
| MERGING POINT | | NO |
| EXIT POINT | | YES |
| TUNNEL | | NO |
| BRIDGE | | NO |
| CLIMBING LANE | | NO |
| THE NUMBER OF LANES ON ONE SIDE | 1 | NO |
| | 2 OR MORE | NO |
| GRADIENT | UP GRADE OF 3% OR MORE | NO |
| | DOWN GRADE OF 3% OR MORE | NO |
| ROAD WIDTH | 3.25 m OR MORE | NO |
| | LESS THAN 3.25 m | NO |
| CURVE RADIUS | 300 m OR MORE | NO |
| | LESS THAN 300 m | NO |

ORDINARY ROAD

| LARGE CLASSIFI-CATION | SMALL CLASSIFICATION | USE OF HYDRAU-LIC CIRCUIT |
|---|---|---|
| SCHOOL ZONE | | YES |
| TUNNEL | | NO |
| BRIDGE | | NO |
| THE NUMBER OF LANES ON ONE SIDE | 1 | YES |
| | 2 OR MORE | NO |
| GRADIENT | UP GRADE OF 10% OR MORE | NO |
| | DOWN GRADE OF 10% OR MORE | NO |
| ROAD WIDTH | 3.00 m OR MORE | NO |
| | LESS THAN 3.00 m | NO |
| CURVE RADIUS | 60 m OR MORE | YES |
| | LESS THAN 60 m | NO |
| SIGN OF "BICYCLE AND PEDESTRIAN LANE" | PRESENT | NO |
| | ABSENT | YES |

AUTOMATIC DECELERATION CONTROL DEVICE

INCORPORATION BY REFERENCE

The disclosure of Japanese Patent Application No. 2015-183007 filed on Sep. 16, 2015 including the specification, drawings and abstract is incorporated herein by reference in its entirety.

BACKGROUND

1. Field of the Disclosure

The disclosure relates generally to a control device for driving assistance for a vehicle, such as an automobile. More specifically, the disclosure relates to an automatic deceleration control device for a vehicle, the automatic deceleration control device being configured to automatically reduce the vehicle speed while the vehicle is traveling.

2. Description of Related Art

In a technical field of driving assistance control for a vehicle, such as an automobile, there is a method of controlling traveling of the vehicle with reference to the conditions and environments surrounding the vehicle in motion, based on the road map information acquired from a global positioning system (GPS) device or the information acquired by an in-vehicle video camera or an in-vehicle radar sensor. For example, according to Japanese Unexamined Patent Application Publication No. 2006-193095 (JP 2006-193095 A), the road-type information about a road on which a vehicle is traveling is acquired from a global positioning system (GPS) navigation device, and the vehicle speed is controlled to be adjusted to a vehicle speed that is preset based on the type of the road on which the vehicle is traveling. In this case, the vehicle speed desired by a driver and the speed limit for the road are compared with each other, and the lower one of these speeds is employed as the vehicle speed that is preset based on the type of the road on which the vehicle is traveling. According to Japanese Unexamined Patent Application Publication (Translation of PCT Application) No. 2015-516623 (JP 2015-516623 A), vehicle control is performed with reference to, for example, the vehicle speeds of other vehicles around a host vehicle.

When decelerating a vehicle, such as an automobile, a driver of the vehicle typically performs a vehicle decelerating operation such that the vehicle decelerates at an appropriate degree (deceleration), based on the type of a road on which the vehicle is traveling. Note that, roads are classified into a plurality of road types depending on the kinds of roads, such as main roads, junction points, merging points, exit points, bridges, tunnels, and climbing lanes, and variations in, for example, the number of lanes, road width, and curvature, in highways or ordinary roads. More specifically, for example, when the speed limit is reduced while the vehicle is traveling on a main road of a highway, the driver applies a brake to the vehicle so as to decelerate the vehicle at a relatively low deceleration, so that the traffic flow around the vehicle is not disturbed. On the other hand, when the vehicle is traveling on a branch road leading to an exit of an interchange, the driver applies a brake to the vehicle so as to decelerate the vehicle at a high deceleration. That is, it can be said that, in many cases, the driver performs a vehicle decelerating operation based on the type of a road on which the vehicle is currently traveling, so that occupants of nearby vehicles and the host vehicle do not feel uncomfortable. If the deceleration of a vehicle (host vehicle) is actually excessively high in the traffic flow around the vehicle, the subsequent vehicle is decelerated or steered in response to relatively sharp reduction in the vehicle speed of the preceding vehicle (host vehicle), so that the traffic flow may be disturbed on the road on which the vehicle is traveling. The braking operation performed by the driver may vary depending on the type of a road on which the vehicle is traveling. For example, when the driver determines the type of a road on which the vehicle is traveling and then applies a brake to the vehicle such that the vehicle is decelerated at a relatively low deceleration, the driver just cancels depression of an accelerator pedal without depressing a foot brake pedal. Thus, only engine braking is used to apply a brake to the vehicle. Only after it is determined that a relatively high deceleration is required, the foot brake pedal is depressed. Desirably, these modes of operations that are performed by the driver in decelerating the vehicle are achieved also in a case where the vehicle speed is automatically controlled in the vehicle driving assistance control such that the driver and passengers do not feel uncomfortable.

SUMMARY

The disclosure provides an automatic deceleration control device to appropriately select or adjust the degree of deceleration based on the type of a road on which a vehicle is traveling, when the vehicle is automatically decelerated in the automatic vehicle speed control or automatic deceleration control that is performed as a kind of the driving assistance control.

A first aspect of the disclosure is an automatic deceleration control device including: an electronic control unit including a central processing unit, the electronic control unit configured to: acquire road-type information that is information about a type of a road on which a vehicle is traveling; set a maximum deceleration based on the road-type information; and output a signal to decelerate the vehicle at a first deceleration that is equal to or lower than the maximum deceleration, when an actual vehicle speed of the vehicle exceeds a target vehicle speed of the vehicle.

According to the above aspect, even in the case where the vehicle is automatically decelerated as well as in the case where the driver directly performs a decelerating operation, the vehicle is decelerated at a deceleration suitable to the type of the traveling road. Consequently, it is expected that the driver will be prevented from feeling uncomfortable and disturbance in the traffic flow will be prevented from occurring in the automatic deceleration.

A second aspect of the disclosure is an automatic deceleration control device comprising An electronic control unit including a central processing unit, the electronic control unit configured to: acquire road-type information that is information about a type of a road on which a vehicle is traveling; select one of a first decelerating operation mode in which only engine braking of the vehicle is applied and a second decelerating operation mode in which engine braking and foot braking of the vehicle are applied, based on the road-type information; and output a signal to decelerate the vehicle in the selected decelerating operation mode when an actual vehicle speed of the vehicle exceeds a target vehicle speed of the vehicle.

In the above aspect, when the vehicle is automatically decelerated as one of driving assistance controls, the degree of deceleration is appropriately selected or adjusted based on the type of the road on which the vehicle is traveling. For example, in the aspects of the disclosure, when the vehicle is decelerated in response a change in the speed limit of the road on which the vehicle is traveling, the degree of deceleration or decelerating operation mode for the deceleration, which varies depending on the type of the road when the speed limit is changed, is selected as the driver typically decelerates the vehicle. Thus, the behavior of the vehicle during deceleration follows a prediction, based on the type of the road, made by the driver and passengers or, for example, the occupants of the nearby vehicles. Consequently, it is expected that the driver will be prevented from feeling uncomfortable and disturbance in the traffic flow will be prevented from occurring in the automatic deceleration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a flowchart of a process performed by the automatic deceleration control device according to the embodiment of the disclosure;

FIG. 2B is a graph schematically illustrating temporal variations in the deceleration when the maximum deceleration is set and an automatic decelerating process is performed;

FIG. 2C is a graph schematically illustrating temporal variations in the braking force generated in the vehicle when a decelerating operation mode is set and an automatic decelerating process is performed;

FIG. 3A is a list in which the road types and the maximum decelerations are associated with each other, the list being referred to when the maximum deceleration is set based on the type of a road; and FIG. 3B is a list in which the road types and the decelerating operation modes (whether or not a hydraulic brake is used) are associated with each other, the list being referred to when the decelerating operation mode is selected based on the type of a road.

DETAILED DESCRIPTION OF EMBODIMENTS

Figure 1A:
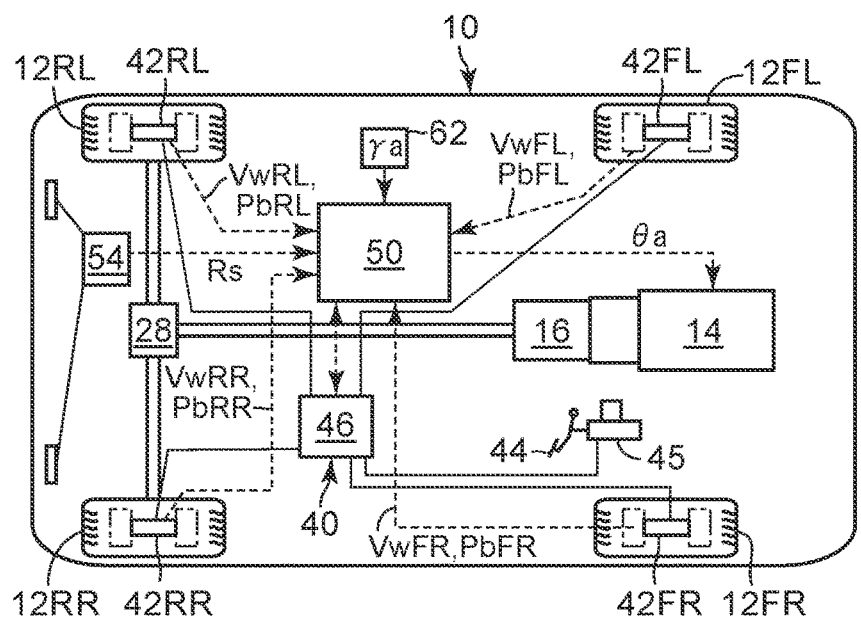
FIG. 1A is a schematic plan view of a vehicle provided with an automatic deceleration control device according to an embodiment of the disclosure.

FIG. 1A schematically illustrates a vehicle 10, such as an automobile, provided with a vehicle driving assistance control device according to an embodiment of the disclosure. As illustrated in FIG. 1A, the vehicle 10 is provided with right and left front wheels 12FR, 12FL, and right and left rear wheels 12RR, 12RL, and the vehicle 10 includes a drive-system apparatus, a steering apparatus, and a braking-system apparatus 40. The drive-system apparatus includes an engine or electric motor 14 that generates a braking-driving force for each wheel in response to depression of an accelerator pedal by a driver, in a normal mode. The steering apparatus is configured to control a steering angle of the front wheels 12FR, 12FL. The braking-system apparatus 40 generates a braking force for each wheel. The drive-system apparatus is configured such that drive torque or a turning force is transmitted from the engine or electric motor 14 to the rear wheels 12RR, 12RL via, for example, a transmission 16 and a differential gear device 28, in a normal mode. Note that, a hybrid driving device including both an engine and an electric motor may be employed. The actuation controls of the engine or electric motor 14 and other devices are performed based on commands from an electronic control unit 50. The steering apparatus may be an ordinary steering apparatus that transmits the rotation of a steering wheel operated by the driver to tie rods, thereby steering the front wheels 12FR, 12FL. The steering apparatus may be a power steering apparatus having any configuration.

The braking-system apparatus 40 is an electronically-controlled hydraulic braking apparatus configured such that a braking pressure in each of wheel cylinders 42 FR, 42FL, 42RR, 42RL (hereinafter, collectively referred to as "wheel cylinders 42i") provided respectively in the wheels 12FR, 12FL, 12RR, 12RL, namely, a braking force in each of the wheels 12FR, 12FL, 12RR, 12RL, is adjusted by a hydraulic circuit 46 communicated with a master cylinder 45 that is actuated in response to depression of a brake pedal 44 by the driver. The hydraulic circuit 46 is provided with various kinds of valves (a master cylinder cut valve, a hydraulic-pressure holding valve, and a pressure-reducing valve) that selectively provide communication between each of the wheel cylinders 42i and the master cylinder 45, an oil pump, or an oil reservoir (not illustrated), in a normal mode. In a normal actuation, in response to depression of the brake pedal 44, a pressure of the master cylinder 45 is supplied to each of the wheel cylinders 42i. When the braking force of each wheel is adjusted to perform the vehicle deceleration control or any other braking force controls, the various kinds of valves are actuated based on commands from the electronic control unit 50, and the braking pressure in each of the wheel cylinders 42i is controlled so as to coincide with a corresponding target pressure, based on a value detected by a corresponding pressure sensor. The braking-system apparatus 40 may be configured such that a braking force is applied to each wheel pneumatically or electromagnetically, or the braking-system apparatus 40 may have a configuration selected by a person skilled in the art.

The information about the type of a road on which the vehicle 10 is traveling (hereinafter, referred also to as "traveling road") (road-type information) is referred to in the automatic deceleration control according to the embodiment of the disclosure. In view of this, the vehicle 10 is provided with a global positioning system (GPS) device (car navigation system) 54 that acquires various kinds of information, such as the road map information, by communicating with a global positioning system (GPS) satellites, or the vehicle 10 is provided with any device for detecting the conditions surrounding the vehicle 10, such as a camera or a radar device. Hereinafter, these devices will be referred to as "GPS device or the like". The information acquired by the GPS device or the like is provided to the electronic control unit 50.

The automatic deceleration control according to the embodiment of the disclosure and the actuation controls of other components of the vehicle 10 are performed by the electronic control unit 50. The electronic control unit 50 may include a microcomputer having an ordinary configuration, and a drive circuit. The microcomputer includes a central processing unit (CPU), a read-only memory (ROM), a random-access memory (RAM), and an input-output port that are connected to each other by a bidirectional common bus. The configurations and actuations of various controllers related to the automatic deceleration control according to the embodiment of the disclosure (described later) may be implemented by the operations of the electronic control unit 50 according to the programs. The electronic control unit 50 receives, as inputs, in addition to the road map information from the GPS device 54 or the like, wheel speed values VwFR, VwFL, VwRR, VwRL from wheel speed sensors provided for the wheels, wheel cylinder pressures PbFR, PbFL, PbRR, PbRL, and detected values from a sensor group or a switch group 62 provided in various portions of the vehicle 10. When decelerating the vehicle, the electronic control unit 50 provides a control command (e.g. a throttle opening degree θa) to the engine or electric motor 14 and provides a control command to the hydraulic circuit 46.

Figure 1B:
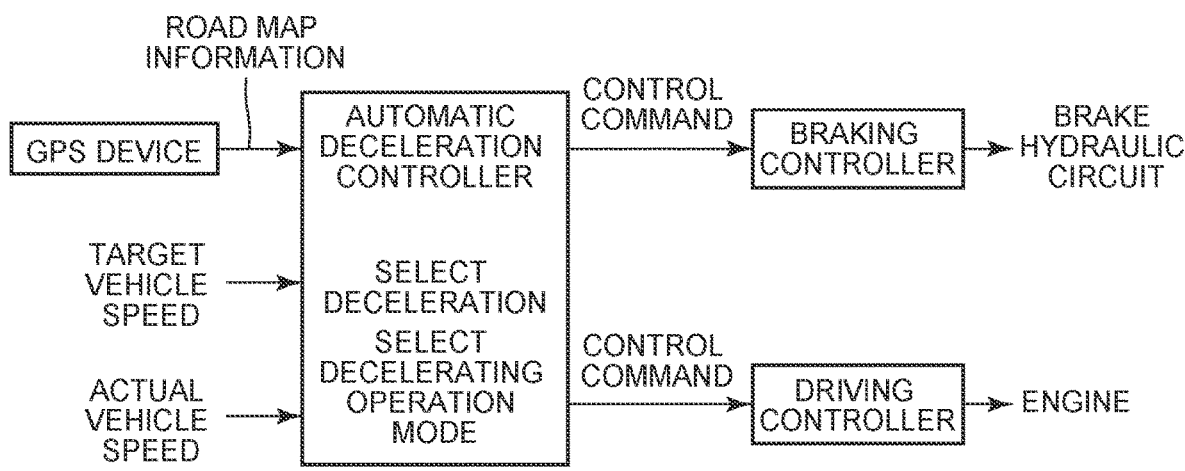
FIG. 1B is a block diagram illustrating the configuration of the automatic deceleration control device according to the embodiment of the disclosure.

The configuration in the electronic control unit 50, which is particularly related to the automatic deceleration control according to the embodiment of the disclosure, will be described with reference to FIG. 1B. An automatic deceleration controller receives the road map information from the GPS device 54, a target vehicle speed value, and an actual vehicle speed value, and then determines whether or not the automatic deceleration is to be performed in a manner described later. When the automatic deceleration is performed, control commands are provided as appropriate to a braking controller configured to control the braking device for the wheels, and to a driving controller configured to perform control of the drive-system apparatus including, for example, the engine or electric motor. The target vehicle speed value may be a value set by any method. The target vehicle speed value may be, for example, a desired vehicle speed set by the driver on a timely basis according to his/her desire, a speed limit of the traveling road, which is acquired from the road map information, or an ideal vehicle speed that is calculated with reference to the road shape such that the vehicle travels safely. When the desired vehicle speed or the ideal vehicle speed exceeds the speed limit, the target vehicle speed value may be forcibly set to the speed limit. The actual vehicle speed may be, for example, a wheel speed value of a turning wheel of the vehicle or a value calculated by any method based on the wheel speed value. The road types acquired from the road map information are illustrated in FIG. 3A and FIG. 3B. As illustrated in FIG. 3A and FIG. 3B, roads are classified into highways and ordinary roads, and further classified into a plurality of types depending on the characteristics of the roads. Regarding highways, roads are classified into a plurality of road types depending on, for example, the kinds of roads, such as merging points, exit points, tunnels, bridges, and climbing lanes, and variations in, for example, the number of lanes on one side, gradient, road width, and curvature radius. Regarding ordinary roads, roads are classified into a plurality of road types depending on, for example, the kinds of roads, such as school zones, tunnels, and bridges, variations in, for example, the number of lanes on one side, gradient, road width, and curvature radius, presence or absence of traffic signs, and presence or absence of bicycle and pedestrian lanes. The type of a road on which the vehicle is currently traveling or a road in the traveling direction is identified by any method with reference to the road information from the GPS device the like or the information about the surroundings of the vehicle. The automatic deceleration controller is provided with a memory that stores setting of the maximum deceleration or decelerating operation mode associated with each of the road types (road-type information) that can be acquired from the road map information. In a process described later, the automatic deceleration controller selects the maximum deceleration or decelerating operation mode set based on the acquired road-type information regarding a road on which the vehicle is currently traveling.

When decelerating the vehicle while the vehicle is traveling, the driver typically decelerates the vehicle at a degree that varies depending on the condition of a road on which the vehicle is traveling. For example, when decelerating the vehicle while the vehicle is traveling on a main road of a highway, the driver just cancels depression of an accelerator pedal without depressing a brake pedal. Thus, only engine braking is used to decelerate the vehicle. On the other hand, for example, when exiting from a highway, the vehicle is decelerated by engine braking and foot braking that occurs in response to depression of the brake pedal. When decelerating the vehicle, many drivers perform a decelerating operation such that the vehicle decelerates at a degree that varies depending on the condition of a road on which the vehicle is traveling. When a vehicle traveling on a traveling road is decelerated, the driver and passengers of the vehicle and, for example, the occupants of other vehicles traveling near the vehicle are considered to predict that the degree of deceleration of the decelerated vehicle is a degree suitable for the condition of the traveling road. When the degree of deceleration of the vehicle on the traveling road differs from an ordinary degree of deceleration, the driver and passengers feel uncomfortable and a situation against a prediction made by, for example, the occupants of other vehicles around the decelerated vehicle takes place. This may cause disturbance in the traffic flow around the vehicle. That is, when the vehicle in motion is decelerated, desirably, the degree of deceleration is adjusted based on the condition of the road, in particular, based on the type of the road. Thus, in the embodiment of the disclosure, when a vehicle is decelerated automatically, that is, when a vehicle is decelerated without a braking operation directly performed by a driver, as a kind of the vehicle driving assistance control, the vehicle is decelerated at a degree that varies depending on the type of a road on which the vehicle is currently traveling or the vehicle is decelerated by a method that varies depending on the type of the road on which the vehicle is currently traveling.

The embodiment of the disclosure includes some examples of the manner of setting a degree of deceleration when a vehicle is decelerated. In a first example, the maximum deceleration, that is, the upper limit of deceleration is set based on the road type. When deceleration is performed, a braking force is generated in the vehicle such that the actual deceleration does not exceed the maximum deceleration. In a second example, depending on the road type, one of a first decelerating operation mode and a second decelerating operation mode is selected. In the first decelerating operation mode, only engine braking is used. In the second decelerating operation mode, both engine braking and foot braking are used. At the time of deceleration, a braking force is generated in the vehicle in the selected decelerating operation mode. In this case, a braking force up to the upper limit of braking force that can be generated by engine braking may be used, or a braking force up to the upper limit of braking force that can be generated by both engine braking and foot braking may be used. However, when the braking force is increased or reduced, the rate of change in the braking force is restricted. In the second example as well, the maximum deceleration may be set, or the maximum deceleration may be set only in the second decelerating operation mode in which foot braking is used.

FIG. 2A is a flowchart of a concrete process performed by the automatic deceleration controller according to the embodiment of the disclosure. The automatic deceleration controller may perform the process in FIG. 2A repeatedly at intervals of a prescribed cycle time while the vehicle is traveling.

As illustrated in FIG. 2A, first, the automatic deceleration controller acquires the road-type information indicating the type of a road on which the vehicle is currently traveling with reference to, for example, the road map information from the GPS device or the like (step 10). As described above, the road-type information is the information indicating the road type classified depending on the characteristic of the road as listed in FIG. 3A and FIG. 3B. Upon acquisition of the road-type information, the automatic deceleration controller refers to setting of the maximum deceleration or decelerating operation mode associated with the road-type information stored in the memory. Then, the automatic deceleration controller selects the maximum deceleration or decelerating operation mode, which is used in performing deceleration and which is associated with the road type indicated by the road-type information (step 12). The first example in which the maximum deceleration is selected will be described below. Specifically, as illustrated in FIG. 3A, one of G1, G2 and G3 is set, as a value of the maximum deceleration, for each of the road types in the road-type information in the memory. In a process in step 12, one of G1, G2 and G3 is selected based on the road type indicated by the acquired road-type information. The values of G1, G2 and G3 may be set experimentally or empirically in advance. Next, the second example in which the decelerating operation mode is selected will be described below. Specifically, as illustrated in FIG. 3B, one of the decelerating operation mode in which only engine braking is used ("NO" in the column indicating whether a hydraulic brake is used, in FIG. 3B) and the decelerating operation mode in which engine braking and foot braking are used in in combination ("YES" in the column indicating whether the hydraulic brake is used, in FIG. 3B) is set in association with each of the road types in the road-type information in the memory. In the process in step 12, the automatic deceleration controller selects one of the decelerating operation modes based on the road type indicated by the acquired road-type information. Which of the decelerating operation modes is assigned to a road of a given type may be determined experimentally or empirically in advance. Even in the second example in which the decelerating operation mode is selected, the maximum deceleration may be set, as described above.

After selecting the maximum deceleration or decelerating operation mode based on the road type indicated by the road-type information as described above, the automatic deceleration controller determines whether the target vehicle speed is reduced to be lower than the target vehicle speed that has been used so far (step 14). As described above, the target vehicle speed may be a value set by any method. The target vehicle speed may be, for example, a desired vehicle speed, an ideal vehicle speed, or a speed limit. Moreover, the target vehicle speed may be set by any device that is other than the automatic deceleration controller according to the embodiment of the disclosure. In this regard, in the state where the automatic deceleration control is performed, the vehicle speed control is performed as the driving assistance control. In this case, typically the target vehicle speed is set by some sort of method, and the actual vehicle speed is adjusted based on the target vehicle speed. The target vehicle speed in the automatic deceleration control according to the embodiment of the disclosure may be such a vehicle speed. Note that the desired vehicle speed may be a value input by a driver on a timely basis. The ideal vehicle speed may be a vehicle speed calculated by any method with reference to the road shape (e.g. curvature, road width) acquired from the GPS device 54 or the like, such that the vehicle travels safely. The speed limit may be acquired from the information included in, for example, the road map information acquired from the GPS device 54 or the like. Further, as described above, in the control in which the actual vehicle speed is automatically adjusted to be equal to or lower than the speed limit of the road, the speed limit is used as the target vehicle speed. In such a case, whether or not the speed limit is reduced to be lower than the speed limit that has been used so far may be determined.

In a process in step 14, when determining that the target vehicle speed is reduced to be lower than the target vehicle speed that has been used so far, the automatic deceleration controller determines whether or not the actual vehicle speed is higher than the target vehicle speed (step 16). When the actual vehicle speed is higher than the target vehicle speed, an automatic deceleration process is performed by applying engine braking or by applying engine braking and foot braking (step 18). Engine braking may be applied upon transmission of a control command to the driving controller. Foot braking may be applied upon transmission of a control command to the braking controller.

In the first example in which the maximum deceleration is selected, a braking force is applied to the vehicle by engine braking or by engine braking and foot braking, such that the deceleration does not exceed the maximum deceleration, in the automatic decelerating process. In this case, the deceleration to be actually generated is controlled as indicated by a1 in FIG. 2B such that a rapid change in the deceleration is avoided. First, the deceleration is increased with the rate of change in the deceleration restricted. Then, at the time when the deceleration reaches the maximum deceleration, the deceleration is kept at the maximum deceleration. When the actual vehicle speed is reduced to the target vehicle speed or approaches the target vehicle speed, the deceleration may be controlled to be reduced with the rate of change in the deceleration restricted. Consequently, as indicated by a2 in FIG. 2B, when the actual vehicle speed is reduced to the target vehicle speed or approaches the target vehicle speed before the deceleration reaches the maximum deceleration, the deceleration is reduced without reaching the maximum deceleration. In braking of a vehicle, typically, engine braking is applied by just reducing the throttle opening degree to zero, and thus foot braking is used only after a braking force that cannot be generated by engine braking is required. That is, as illustrated in FIG. 2C, in the case where the deceleration is controlled, engine braking is applied first, and foot braking is used when the deceleration needs to be further increased.

In the second example in which the decelerating operation mode is selected, engine braking is applied or engine braking and foot braking are applied based on the selected decelerating operation mode, in the automatic decelerating process. In this case, in the decelerating operation mode in which only engine braking is used, as schematically indicated by EB in FIG. 2C, the braking force generated by engine braking is increased with the rate of change in the braking force restricted. When the braking force generated by engine braking reaches the upper limit thereof before the actual vehicle speed is reduced to the target vehicle speed, braking of the vehicle is continued in this state. When engine braking and foot braking are used in combination, after the braking force generated by engine braking reaches the upper limit, as schematically indicated by FB in FIG. 2C, the braking force generated by foot braking starts to be increased. When the braking force generated by foot braking reaches the upper limit thereof before the actual vehicle speed is reduced to the target vehicle speed, braking of the vehicle is continued in the state where the braking force generated by foot braking and engine braking have reached the upper limit. Note that, regarding engine braking and foot braking, increases in the braking force generated by engine braking and the braking force generated by foot braking may be restricted using, as the maximum deceleration, a deceleration at the level lower than the upper limit. The maximum deceleration may be set when only foot braking is used. Foot braking may be applied before the braking force generated by engine braking reaches the upper limit.

According to the embodiment of the disclosure, when the automatic deceleration is performed, the vehicle is decelerated at a degree that varies depending on the road type. Thus, the behavior of the vehicle during deceleration is made similar to that when a driver performs a decelerating operation. Consequently, it is expected that the driver will be prevented from feeling uncomfortable and disturbance in the traffic flow will be prevented from occurring in the automatic deceleration.

In addition, "road-type information" may be information indicating the kinds of roads, such as main roads, junction points, merging points, exit points, bridges, tunnels, and climbing lanes, and variations in, for example, the number of lanes, curvature, and road width, in highways or ordinary roads. For example, the road-type information may be acquired from the road map information from a GPS navigation device or the like. The target vehicle speed may be set by any method. The target vehicle speed may be, for example, a desired vehicle speed set by a driver, a speed limit set for each road, or a vehicle speed (an ideal vehicle speed) that is an appropriate vehicle speed based on the road shape (e.g., curvature, road width, gradient). Especially, in a road for which the speed limit is set, when the desired vehicle speed or the ideal vehicle speed exceeds the speed limit, the target vehicle speed may be forcibly set to the speed limit. The value of actual vehicle speed may be calculated by any method known in this technical field, based on, for example, the wheel speed. The road types in the road-type information and the decelerating operation modes may be associated with each other in advance. In this case, regarding the degree of deceleration when the vehicle is actually decelerated, the deceleration or braking force may be increased or reduced such that the rate of change thereof is not excessive. Consequently, even when foot braking will be applied, only engine braking may be applied immediately after braking of the vehicle is started.

What is claimed is:

1. An automatic deceleration control device comprising:
   an electronic control unit including a central processing unit, the electronic control unit configured to:
   acquire road-type information that is information about a type of a road on which a vehicle is traveling;
   set a maximum deceleration for the automatic deceleration control device based on the road-type information;
   after the maximum deceleration is set and when a target vehicle speed is reduced to be lower than a previous target vehicle speed, determine whether an actual vehicle speed of the vehicle exceeds a current target vehicle speed of the vehicle; and
   based upon the actual vehicle speed exceeding the current target vehicle speed, output a signal to automatically decelerate the vehicle at a first deceleration that is equal to or lower than the maximum deceleration.

2. The automatic deceleration control device according to claim 1, wherein the electronic control unit is configured to set the maximum deceleration to a value that varies depending on the road-type information.

3. The automatic deceleration control device according to claim 1, wherein the electronic control unit is configured to set, as the maximum deceleration, one of a first maximum deceleration that is generated only by engine braking of the vehicle and a second maximum deceleration that is generated by engine braking and foot braking of the vehicle.

4. The automatic deceleration control device according to claim 1, wherein the electronic control unit is configured to increase the first deceleration after the vehicle starts to be decelerated.

5. The automatic deceleration control device according to claim 4, wherein the electronic control unit is configured to maintain the first deceleration at the maximum deceleration when the first deceleration reaches the maximum deceleration.

6. The automatic deceleration control device according to claim 4, wherein the electronic control unit is configured to reduce the first deceleration when the actual vehicle speed reaches the target vehicle speed.

7. The automatic deceleration control device according to claim 1, wherein the type of road on which the vehicle is traveling is obtained from a global positioning system (GPS) device.

8. An automatic deceleration control device comprising:
   an electronic control unit including a central processing unit, the electronic control unit configured to:
   acquire road-type information that is information about a type of a road on which a vehicle is traveling;
   select one of a first decelerating operation mode in which only engine braking of the vehicle is applied and a second decelerating operation mode in which engine braking and foot braking of the vehicle are applied by the automatic deceleration control device, based on the road-type information;
   after the decelerating operation mode is selected, determine whether an actual vehicle speed of the vehicle exceeds a current target vehicle speed of the vehicle that is different from a previous target vehicle speed; and
   based upon the actual vehicle speed of the vehicle exceeding the current target vehicle speed, output a signal to automatically decelerate the vehicle in the selected decelerating operation mode.

9. An automatic deceleration control device comprising:
   an electronic control unit including a central processing unit, the electronic control unit configured to:
   acquire road-type information that is information about a type of a road on which a vehicle is traveling, wherein the type of the road is an exit point;
   set a maximum deceleration for the automatic deceleration control device based on the road-type information;
   after the maximum deceleration is set and when a target vehicle speed is reduced to be lower than a previous target vehicle speed, determine whether an actual vehicle speed of the vehicle exceeds a current target vehicle speed of the vehicle; and
   based upon the actual vehicle speed exceeding the current target vehicle speed, output a signal to automatically decelerate the vehicle at a first deceleration that is equal to or lower than the maximum deceleration.

* * * * *